United States Patent [19]

Thomas

[11] Patent Number: 5,222,288
[45] Date of Patent: Jun. 29, 1993

[54] METHOD FOR FORMING A SPIRAL-WOUND FLEXIBLE PIPING

[75] Inventor: Roy W. Thomas, Attica, Ind.

[73] Assignee: Tru-Flex Metal Hose Corporation, Lebanon, Ind.

[21] Appl. No.: 803,051

[22] Filed: Dec. 6, 1991

Related U.S. Application Data

[63] Continuation-in-part of Ser. No. 716,851, Jun. 17, 1991.

[51] Int. Cl.⁵ .............................................. B21D 39/00
[52] U.S. Cl. ......................................... 29/514; 29/429
[58] Field of Search ................. 29/429, 509, 514, 510, 29/890.144; 138/150, 154; 72/49, 50

[56] References Cited

U.S. PATENT DOCUMENTS

| | | |
|---|---|---|
| 510,481 | 12/1893 | Linzeler et al. . |
| 768,107 | 8/1904 | Williams . |
| 967,260 | 8/1910 | Witzenmann et al. . |
| 1,030,016 | 6/1912 | Rosenthal . |
| 1,179,578 | 4/1916 | Sundh . |
| 1,366,621 | 1/1921 | Wood . |
| 1,411,960 | 4/1922 | Doino . |
| 1,453,220 | 4/1923 | Witzenmann . |
| 1,512,802 | 10/1924 | Robertson et al. . |
| 1,978,529 | 10/1934 | Harrah ........................ 29/890.144 |
| 2,365,286 | 12/1944 | Moseley et al. . |
| 2,401,949 | 6/1946 | Mariner . |
| 2,874,722 | 2/1959 | Hamblin . |
| 2,936,792 | 5/1960 | MacCracken et al. . |
| 2,943,540 | 7/1960 | McBain . |
| 3,073,351 | 1/1963 | Nichols . |
| 3,086,556 | 4/1963 | Kanter . |
| 3,094,147 | 6/1963 | Nemer . |
| 3,259,533 | 7/1966 | Philipson . |
| 3,473,575 | 10/1969 | Vogelsang et al. . |
| 3,540,490 | 11/1970 | Jensen et al. . |
| 3,548,882 | 12/1970 | Rinker . |
| 3,616,123 | 10/1971 | Reynolds et al. . |
| 3,694,892 | 10/1972 | Hale . |
| 3,706,326 | 12/1972 | Bringolf . |
| 3,783,908 | 1/1974 | Stump et al. . |
| 3,815,639 | 6/1974 | Westerbarkey . |
| 3,844,315 | 10/1974 | Williams . |
| 3,979,818 | 9/1976 | Groch et al. . |
| 3,990,478 | 11/1976 | McFarland . |
| 4,160,312 | 7/1979 | Nyssen . |
| 4,172,474 | 10/1979 | Stahl . |
| 4,197,728 | 4/1980 | McGowen . |
| 4,220,181 | 9/1980 | Nyssen . |
| 4,342,612 | 8/1982 | Lalikos et al. . |
| 4,344,462 | 8/1982 | Aubert et al. . |
| 4,481,978 | 11/1984 | Escandell . |
| 4,487,232 | 12/1984 | Kanao . |
| 4,557,297 | 12/1985 | Montana . |
| 4,598,739 | 7/1986 | Burcher . |
| 4,620,569 | 11/1986 | von Glanstatten et al. . |
| 4,688,319 | 8/1987 | Gross et al. . |
| 4,796,672 | 1/1989 | Kanao . |
| 4,800,928 | 1/1989 | Kanao . |
| 4,823,847 | 4/1989 | Grosse et al. . |
| 4,854,416 | 8/1989 | Lalikos et al. ...................... 181/207 |
| 4,862,924 | 9/1989 | Kanao . |
| 4,965,105 | 10/1990 | Ruggeberg et al. . |
| 4,998,597 | 3/1991 | Bainbridge et al. . |
| 5,004,018 | 4/1991 | Bainbridge . |

Primary Examiner—Timothy V. Eley
Attorney, Agent, or Firm—Litman, McMahon & Brown

[57] ABSTRACT

Flexible piping includes a first, spiral-wound band forming an inner winding and a second, spiral-wound band forming an outer winding in covering relationship over the inner winding. Inner and outer spiral-wound bands of insulating material are wound between the inner and outer windings and over the outer winding respectively. An insulating sleeve receives the spiral-wound inner and outer windings and the inner and outer insulating material bands. A method and a machine for forming the flexible piping are also disclosed.

17 Claims, 3 Drawing Sheets

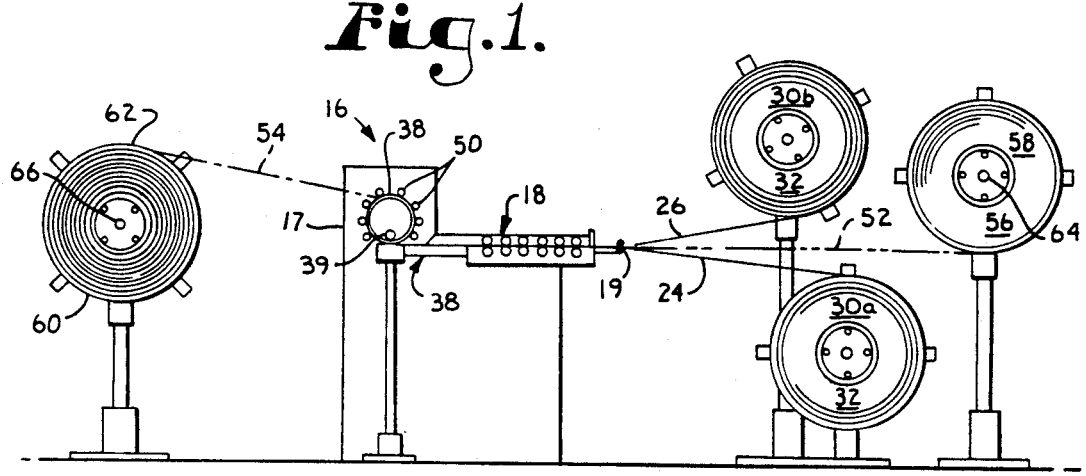
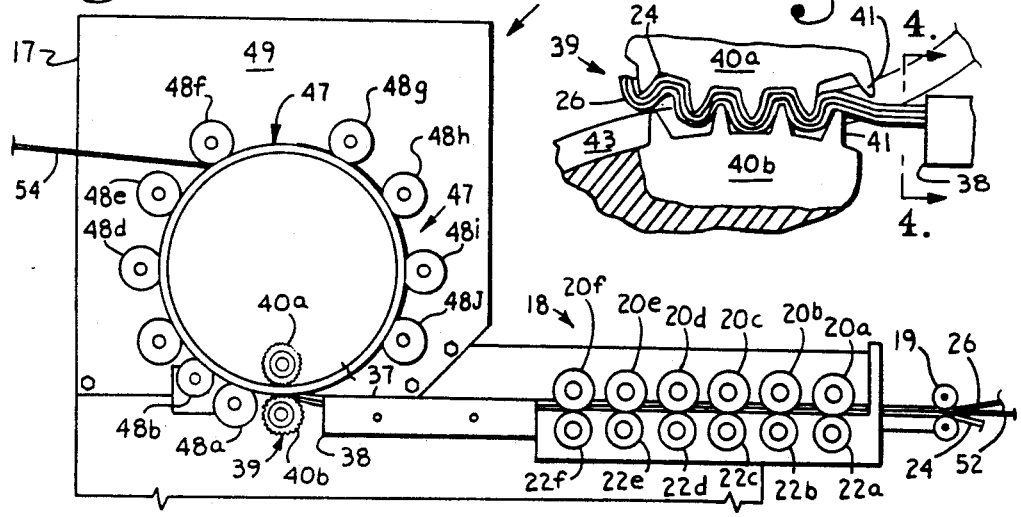
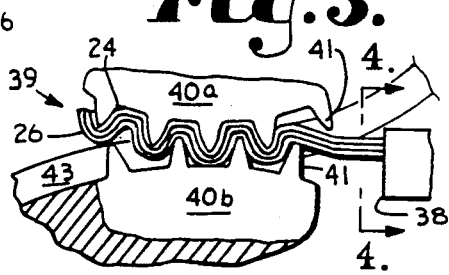
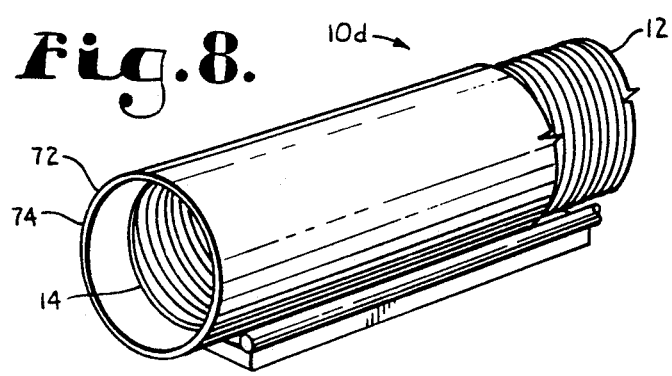
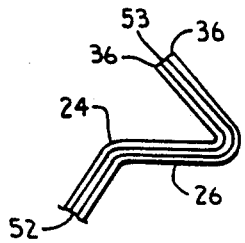

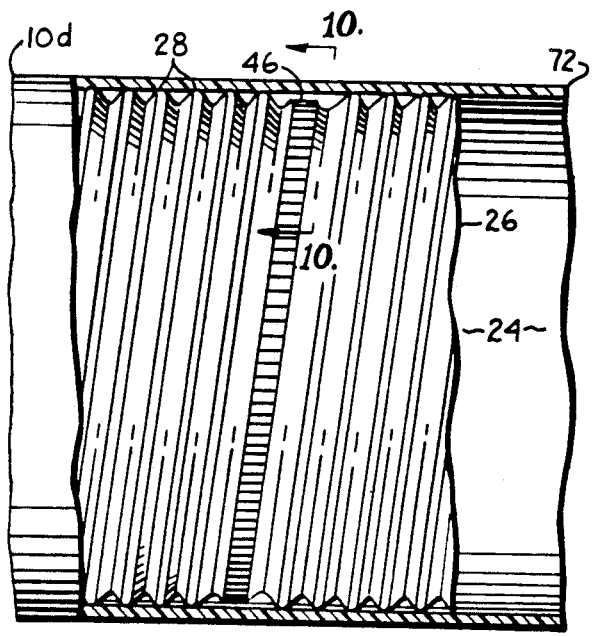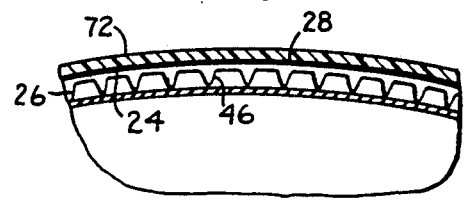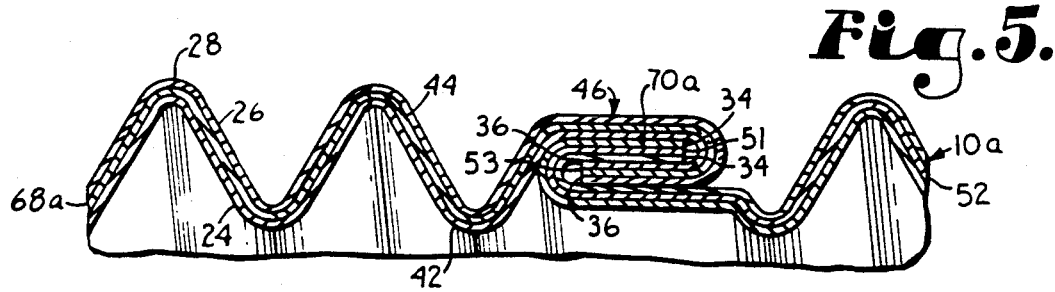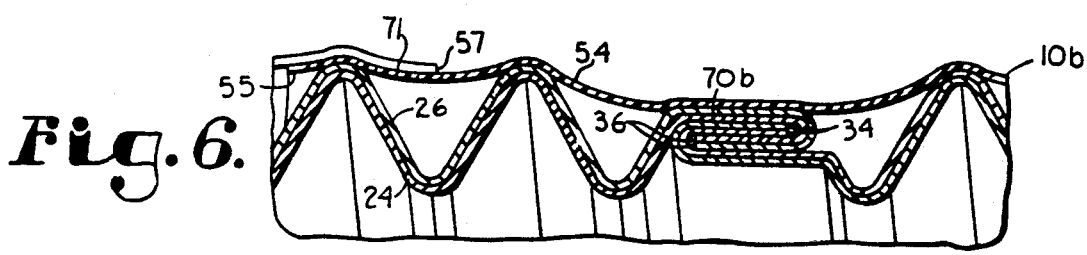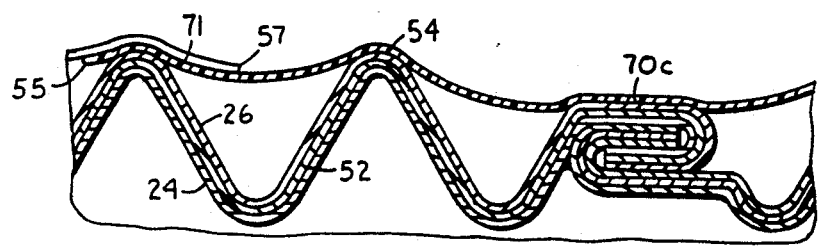

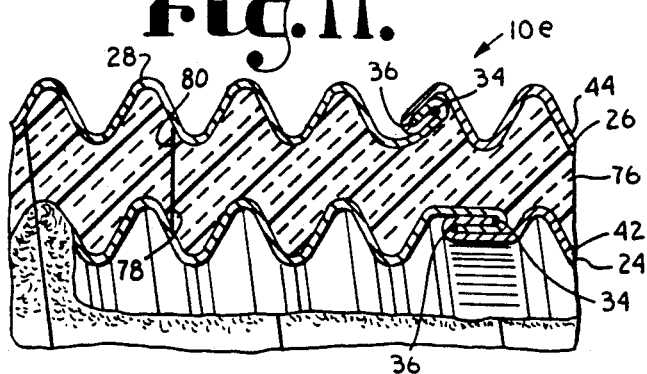
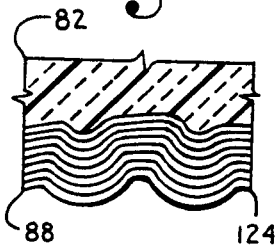
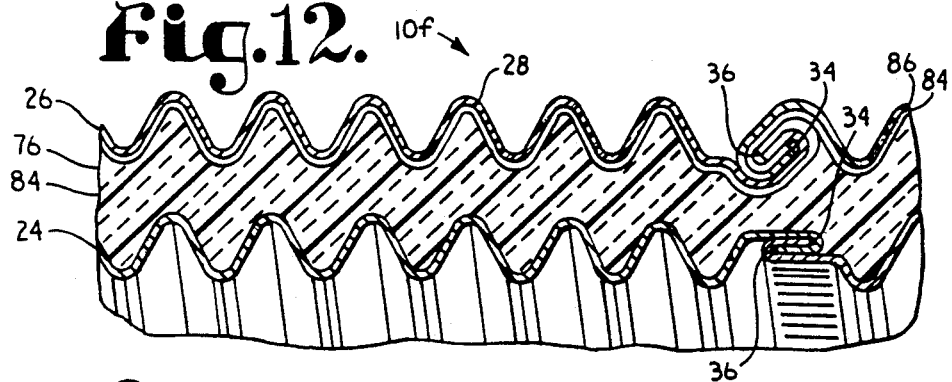
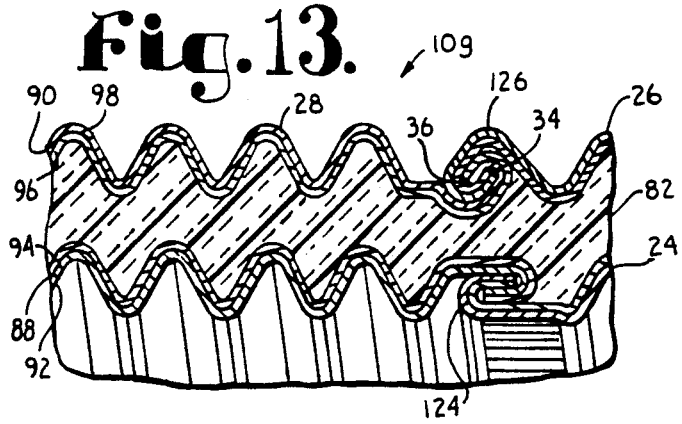
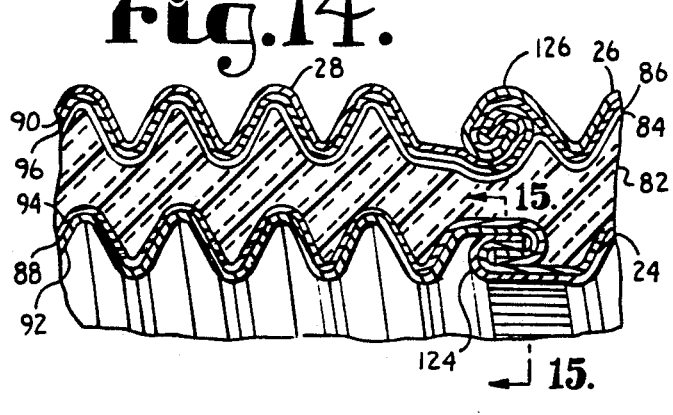
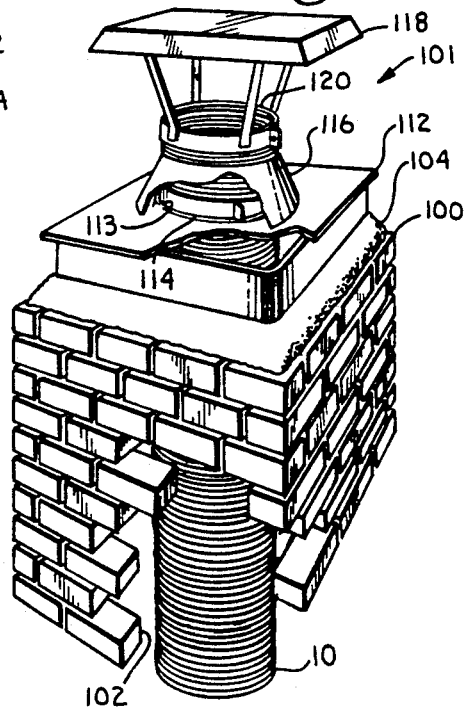

METHOD FOR FORMING A SPIRAL-WOUND FLEXIBLE PIPING

CROSS-REFERENCE TO RELATED APPLICATION

This application is a Continuation-In-Part of application Ser. No. 716,851 filed Jun. 17, 1991.

BACKGROUND OF THE INVENTION

Field of the Invention

The present invention relates generally to flexible piping, and in particular to multi-layered flexible piping with an insulating layer or layers.

Description of the Related Art

Flexible piping is utilized in a variety of applications. For example, flexible piping or hose can be used for conveying various fluids, such as exhaust gases from internal combustion engines in vehicles and other equipment, for ventilation, for fuel hose such as on gas grills, and for lining chimneys and flues. Flexible piping or hose can also be used for conveying bulk materials, such as dust, pellets, grain, etc. One type of flexible piping can be formed by spiral-winding material bands or windings on a pipe winding machine. Previous types of pipe winding machines have used hook-shaped band guides and rotating mandrels for spiral-winding flexible piping. For example, the McGowen U.S. Pat. No. 4,197,728 discloses a pipe winding machine with a rotating mandrel for receiving bands from a series of profiling rollers which shape the bands for interlocking engagement on the mandrel. Piping formed in this manner is flexible because the interlocking connection of the band edges permits limited axial slippage between adjacent bands.

Another type of pipe winding machine uses profiling rollers for imparting a convoluted cross-sectional configuration to a continuous length of band material. The band edges are interlocked by knurling wheels with this type of machine. Piping flexibility is provided by the convolutions of the band, which permit axial compression and expansion.

An advantage of having piping sections formed by spiral-winding is that they can be formed to practically any length and with various diameters. However, forming a fluid-tight seal between the interlocking, spiral-wound bands can be difficult, particularly since the interlocking bands often have sliding metal-to-metal contact areas which can pass fluid.

In many flexible piping applications it may be desirable to insulate the flexible piping. Such insulation can provide thermal, moisture and corrosion protection and control. For example, a layer of insulation may be desirable for providing a vapor barrier to control exposure of the flexible piping to moisture. Insulation may also be desirable to achieve fluid-tightness with flexible piping which conducts exhaust fumes or other fluids with undesirable (e.g., toxic) properties, and to contain such fluids within a fluid-handling system including insulated flexible piping to protect persons, property and the environment from exposure to such undesirable and potentially harmful fluids.

Heretofore there has not been available flexible piping, a method of producing same or a machine for producing same, with the advantages and features of the present invention.

SUMMARY OF THE INVENTION

In the practice of the present invention, flexible piping is provided which includes inner and outer material bands or windings which are spiral-wound and interlocked with the outer material band overlying the inner material band. An insulating material band is spiral-wound between the inner and outer material bands in one embodiment of the invention, and is spiral-wound over the outer winding in another embodiment of the invention. Further embodiments of the invention can include multiple, spiral-wound insulating material bands and an insulation sleeve.

A method for forming insulated flexible piping is also provided in the practice of the present invention. In the practice of the method of the present invention, an inner winding is spiral-wound on a winding machine and an outer winding is wound thereover in overlying relation. The inner and outer windings are interlocked. An insulating material band is wound on the windings. The method can include the steps of winding the insulating material band between the inner and outer windings, over the outer winding, or both.

Further in the practice of the present invention, a machine is provided for winding the multi-layered flexible piping and includes stations for feeding inner and outer windings and inner and outer bands of insulating material.

OBJECTS AND ADVANTAGES OF THE INVENTION

The objects and advantages of the present invention include: providing flexible piping; providing multi-layered flexible piping; providing insulated flexible piping; providing flexible piping with an insulating corrosion barrier; providing flexible piping with an insulating thermal barrier; providing flexible piping with an insulating fluid barrier; providing flexible piping with multiple, alternating layers comprising metal windings and insulating bands; providing flexible piping which effectively contains and conveys fluids; providing such flexible piping which can be formed from various materials; providing such flexible piping which can be adapted to convey various substances; providing such flexible piping which can be formed on existing pipe-winding equipment with relatively minor modifications thereto; providing such flexible piping which is economical to manufacture, efficient in operation and particularly well adapted for the proposed usage thereof; providing a method for forming flexible piping; and providing a machine for forming flexible piping.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a flexible pipe winding apparatus or machine embodying the present invention.

FIG. 2 is an enlarged, fragmentary, side elevational view of the flexible pipe winding apparatus or machine.

FIG. 3 is an enlarged, fragmentary side elevational view of the flexible pipe winding apparatus or machine, particularly showing a knurling station thereof.

FIG. 4 is an enlarged, fragmentary, cross-sectional view taken generally along line 4—4 in FIG. 3 and particularly showing a composite band just prior to entering the knurling station.

FIG. 5 is a longitudinal, cross-sectional view of flexible piping 10a embodying the present invention.

FIG. 6 is a longitudinal, cross-sectional view of flexible piping 10b comprising a first modified or alternative embodiment of the present invention.

FIG. 7 is a longitudinal, cross-sectional view of flexible piping 10c comprising a second modified or alternative embodiment of the present invention.

FIG. 8 is a perspective view of flexible piping 10d comprising a third modified or alternative embodiment of the present invention with an insulation sleeve.

FIG. 9 is a fragmentary, side elevational view of the flexible piping 10d comprising a third modified or alternative embodiment of the present invention, with portions broken away to reveal construction.

FIG. 10 is a transverse, fragmentary, cross-sectional view of the flexible piping 10d comprising a third modified or alternative embodiment of the present invention, taken generally along line 10—10 in FIG. 9.

FIG. 11 is fragmentary, longitudinal, cross-sectional view of flexible piping 10e comprising a fourth modified or alternative embodiment of the present invention.

FIG. 12 is a fragmentary, longitudinal, cross-sectional view of flexible piping 10f comprising a fifth modified or alternative embodiment of the present invention.

FIG. 13 is a fragmentary, longitudinal, cross-sectional view of flexible piping 10g comprising a sixth modified or alternative embodiment of the present invention.

FIG. 14 is a fragmentary, longitudinal, cross-sectional view of flexible piping 10h comprising a seventh modified or alternative embodiment of the present invention.

FIG. 15 is a fragmentary, transverse, cross-sectional view of the flexible piping 10h comprising a seventh modified or alternative embodiment of the present invention, taken generally along line 15—15 in FIG. 14.

FIG. 16 is a top, perspective view of flexible piping embodying the present invention, shown installed as a flue liner in a chimney.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 10 generally designates flexible piping embodying the present invention. The flexible piping 10 can be formed in piping sections 12 of various lengths with opposite piping section ends 14. Flexible piping 10 can be formed on a pipe winding machine or apparatus 16.

The pipe winding machine 16 includes a band forming or profiling station 18 with upper profiling rollers 20a-f and lower profiling rollers 22a-f grouped in pairs for profiling a first or inner metal band 24 and a second or outer metal band 26 with convolutions or corrugations 28. The convolutions 28 generally have the cross-sectional configuration of a wave of constant amplitude and frequency. The metal bands 24, 26 can be fed from band feed stations 30a,b each rotatably mounting a coil 32 of the band material, e.g., steel, aluminum, etc. The bands 24, 26 have first or leading band edges 34 and second or trailing band edges 36.

Downstream of the band forming/profiling station 18 is an edge forming or tucking station 37 with a tucker assembly 38. The metal bands 24, 26 have their respective edges 34, 36 folded at the edge forming/tucking station 37 by the tucker assembly 38 for interlocking engagement.

Downstream of the tucker assembly 38 is a knurling station 39 with a pair of knurling wheels 40a,b with intermeshing teeth 41 for crimping the leading band edges 34 of inner and outer windings 42, 44 which have just passed through the tucker assembly 38 and the trailing band edges 36 of the windings 42, 44 which have just completed a full revolution on the pipe winding machine 16. The knurling wheels 40a,b also include driven, convoluted sections 43 with configurations corresponding to the corrugations or convolutions 28 of the metal bands 24, 26 (FIG. 3). Since the knurling wheel convoluted sections 43 are driven, the teeth 41 thereof can be non-driven, i.e., permitted to idle. The intermeshing teeth 41 form a stitched crimp seam 46 of the band leading and trailing edges 34, 36 at the knurling station 39.

A pipe winding station 47 comprises a plurality of guide/idler rollers 48a-j arrayed in a generally circular configuration on a back plate 49. Each guide roller 48 has a convoluted surface configuration corresponding to the band convolutions 28. The guide rollers 48a-j extend progressively further out from the back plate 49 as they progress clockwise from the knurling station 39 to form a generally helical configuration on the back plate 49. The guide rollers 48a-j thus form a generally helical path for the windings 42, 44, whereby the windings 42, 44 are axially displaced approximately one winding width for each revolution. The guide rollers 48a-j can be pitched, e.g. about 3½° to 7° with respect to the face of the back plate 49, to impart a generally helical configuration to the windings 42, 44. In this manner the flexible piping 10 is spiral-wound as the windings 42, 44 wind around the pipe winding station 47. The spacing and number of the guide rollers 48a-j can be adjusted and varied on the back plate 49 to wind flexible piping 10 with different diameters.

The lengths of piping section 12 which can be formed on the machine 16 are practically unlimited, although it may be desirable to cut the sections 1 into predetermined lengths which are convenient for shipping and installation in the various applications for the flexible piping 10.

II. Insulating Bands 52, 54

A first or inner insulating or sealing material band 52 and a second or outer insulating or sealing material band 54 can be incorporated, individually or in combination, into the flexible piping 10. The first or inner insulating band 52 can be dispensed from a roll or coil 56 at a first insulating band feeding station 58, which can be located in the general vicinity of the band feeding stations 30a,b at an upstream end of the pipe winding machine 16. The second or outer insulating band 54 can be dispensed from a roll or coil 60 at a second insulating band feeding station 62, which can be located, for example, in proximity to a downstream end of the pipe winding machine 16. The feeding stations 58, 62 can rotatably mount the insulating band rolls 56, 60 for dispensing. The first insulating band roll 56 can rotate about a rotational axis 64 which extends generally transversely with respect to the paths of movement of the metal bands 24, 26 and the first insulating band 52 into the band forming station 18. The second insulating band roll 60 can rotate about a rotational axis 66 which extends generally parallel to the flexible piping 10 and its rotational axis.

III. Insulated Piping Configurations 10a-h

Insulated, flexible piping 10 according to the present invention can be formed in various configurations on the pipe winding machine 16. FIG. 5 shows a first configuration in cross-section wherein the first or inner insulating band 52 is sandwiched between the inner and outer metal bands 24, 26, whereby a laminated composite band 68a is formed with the insulating band 52 between the inner and outer metal bands 24, 26. The composite band 68a can be pulled through the band forming/profiling station 18 where the corrugations 28 are formed. The corrugated composite band 68a is then passed through the tucker assembly 38 for edge-folding (FIG. 4). The composite band 68a is then spiral-wound on the pipe winding station 47. The band leading and trailing edges 34, 36 are knurled or crimped together with the metal band leading and trailing edges 34, 36 in an interlocking seam 70a with the insulating band leading and trailing edges 51, 53 (FIG. 5).

Insulated flexible piping 10b comprising a first modified or alternative embodiment of the present invention is shown in FIG. 6 and comprises a composite band 68b with a first or inner metal band 24, a second or outer metal band 26 and an outer insulating band 54 placed in overlying relation, in that order from inside-to-outside. The outer insulating band 54 is applied at the feeding station 62, i.e., subsequent to the forming, spiral-winding and edge interlocking procedures on the metal bands 24, 26 forming an interlocking seam 70b. The outer insulating band 54 can thus form an overlapping seam 71 with its leading and trailing edges 55, 57. The insulating band 54 can comprise a suitable elastomeric material with sufficient stretching and memory characteristics that by winding it on the spiral-wound inner and outer bands 24, 26, under tension, the insulating band 54 would conform somewhat to the corrugated outer surface of the flexible piping 10b.

Flexible piping 10c is shown in FIG. 7 and comprises a second modified or alternative embodiment of the present invention and includes the inner metal band 24, the inner insulating band 52, the outer metal band 26, and the outer insulating band 54 (in that order from inside-to-outside) whereby double layers of metal 26, 28 alternate with double layers of insulation 52, 54 in a composite band 68c. An interlocking seam 70c is formed by the metallic material band leading and trailing edges 34, 36 and by the inner insulating band leading and trailing edges 51, 53. An overlapping seam 71 is formed by the outer insulating band leading and trailing edges 55, 57.

Flexible piping 10d comprising a third modified or alternative embodiment of the present invention is shown in FIGS. 8-10 and comprises spiral-wound metal bands 24, 26 inserted in an insulation sleeve 72. The insulation sleeve 72 can be substantially tubular, with an initial inside diameter slightly greater than an outside diameter of the spiral-wound metal bands 24, 26. The sleeve 72 can be positioned downstream of and coaxially aligned with the pipe winding station 47 in an open position to receive the spiral-wound, interlocked metal bands 24, 26 as they exit the mandrel 40. The insulation sleeve 72 can be precut to lengths slightly longer than the piping sections 12 to which it is applied whereby insulation sleeve end extensions 74 are provided. The insulation sleeve end extensions 74 can be used to overlap "T" connectors or "rain hat" connectors in exhaust piping and flue applications, and can permit an installer to substantially seal a complete piping or ducting system by overlapping the insulation sleeve extensions 74 of multiple piping sections 12 with various other system components connected thereto. The extensions 74 can project about one to two feet from the piping section ends 14 for many applications, but extensions 74 of practically any length can be provided. The insulating sleeve 72 can be applied to any of the insulated flexible piping configurations 10a-d discussed above, and can also be applied to various other flexible piping configurations for the insulation and sealing thereof.

The materials comprising the insulating bands 52, 54 and the insulating sleeve 72 can be chosen for the requirements of particular applications. For example, various plastic materials can be used, such as polypropylene, which can provide fluid sealing, corrosion resistance and thermal insulation properties and resistance to certain types of chemicals. The insulating material can also comprise various metallic foils. Still further, cloth (e.g., asbestos), fiberglass, ceramic and paper materials could be used. The metal bands 24, 26 can also comprise any suitable material. e.g. aluminum, steel, tin, copper, etc. By combining different materials in the metal bands 24, 26 and the insulating bands 52, 54, a cooperation between the different materials can be achieved whereby the flexible piping 10 has resulting functional advantages which are achieved by taking advantage of the combined characteristics of the metal and insulating band materials. Thus, the cooperative effect between these different materials can provide a wide range of beneficial operating characteristics for the resulting flexible piping 10.

A fourth modified or alternative embodiment of insulated, flexible piping embodying the present invention is shown in FIG. 11 and is generally designated by the reference numeral 10e. The piping 10e includes inner and outer, spiral-wound metal bands 24, 26. A thermal insulating band 76 of material such as fiberglass insulation is placed, e.g., by spiral-winding, between the metal bands 24, 26, which form inner and outer windings 42, 44 respectively. The insulating band 76 includes abutting leading and trailing edges 78, 80.

FIG. 12 shows a fifth modified or alternative embodiment of the flexible piping, which is generally designated by the reference numeral 10f. The flexible piping 10f comprises inner and outer spiral-wound metal bands 24, 26. A layer 82 of thermal insulation (e.g., fiberglass) is placed (e.g., by spiral-winding an insulating band 76) between the inner and outer metal bands 24, 26. A further insulation/sealing layer 84 comprises a band 86 of adhesive-backed tape which is spiral-wound on the insulating band 76 and provides a fluid barrier.

A sixth modified or alternative embodiment of the present invention is shown in FIG. 13 and comprises flexible tubing or piping, which is generally designated by the reference numeral 10g. The flexible piping 10g includes an inner, spiral-wound tubular member 88 comprising inner and outer spiral-wound inner tubular member bands 92, 94 and an outer, spiral-wound tubular member 90 comprising inner and outer spiral-wound outer tubular member bands 96, 98. The bands 92, 94, 96 and 98 can comprise a suitable metallic strip material, and different materials can be used for the different bands to take advantage of the particular material advantages and properties thereof. Thus, the flexible tubing 10g comprises a total of four metallic layers, two each on the inside and the outside.

A layer 82 of insulation (e.g., fiberglass) is spiral-wound between the inner and outer, helically-corrugated tubular members 88, 90.

The inner tubular member 88 and the outer tubular member 90 include inner and outer helical interlocking seams 124, 126 respectively whereat the leading and trailing edges 34, 36 of the bands 92, 94, 96 and 98 are interconnected.

Flexible piping comprising an seventh modified or il alternative embodiment of the present invention is show in FIG. 14 and is generally designed by the reference numeral 10h. Like the flexible piping 10g, the flexible piping 10h includes inner and outer double-thickness tubular members 89, 90 having inner and outer layers respectively comprising spiral-wound metal bands 92, 94 and 96. In addition, the flexible piping 10h includes an inner, fluid barrier material layer 84, which can comprise, for example, adhesive-backed tape 86 spiral-wound on the fiberglass insulation layer 82.

One or both of the seams 124, 126 can be knurled or "stitched", i.e., with knurling wheels 40a, 40b. For example, it may be desirable to provide an inner, knurled seam 124 as shown (FIG. 15) for strength and to not knurl the outer seam 126 so that it remains substantially hidden and does not alter the general exterior appearance of the piping 10h. The interlocking seams 124, 126, if uncrimped, can be formed with appearances substantially similar to those of the corrugations or convolutions 28 of the bands 24, 26.

Without limitation on the generality of useful applications of the flexible piping 10a–h, it can be used as a flue or vent for an existing chimney 100 (FIG. 16) and connected to various appliances and equipment which produce combustion exhaust. Such appliances and equipment can include, without limitation, furnaces, boilers, hot water heaters, wood burning stoves and fireplaces. The configurations and installations of such flue systems are governed by building and fire codes in many jurisdictions. For example, Class B flues normally require about 1" of spacing from combustibles and are usable only with certain types of equipment and appliances.

FIG. 16 shows a retrofit flue construction 101 in an existing chimney 100 and includes flexible piping 10 which is extended through a chimney interior 102 and protrudes upwardly from a chimney upper end 104. A top plate 112 can be placed over the chimney upper end 104 with the flexible piping 10 extending upwardly through an opening 113 formed therein and secured by a support clamp 114. A rain collar is placed on top of the top plate 112 and receives the flexible piping 10, which extends upwardly through an opening therein. A chimney cap 118 can be mounted on an upper, free end 120 of the flexible piping 10.

It is to be understood that while certain forms of the present invention have been illustrated and described herein, it is not to be limited to the specific forms or arrangement of parts described and shown.

What is claimed and desired to be secured by Letters Patent is as follows:

1. A method of forming flexible piping, which includes the steps of:
   (a) spiral-winding an inner winding comprising a metallic band;
   (b) interlocking leading and trailing edges of said inner winding;
   (c) spiral-winding an outer winding comprising a metallic band in overlying relation over said inner winding;
   (d) interlocking leading and trailing edges of said outer winding; and
   (e) spiral-winding a sealing material band in overlying relation with respect to at least one of said inner and outer windings.

2. The invention of claim 1, which includes the additional step of:
   (a) interlocking leading and trailing edges of said sealing material band.

3. The invention of claim 1, which includes the additional steps of:
   (a) interlocking the leading edges of said inner winding, said outer winding and said sealing material band; and
   (b) interlocking the trailing edges of said inner winding, said outer winding and said sealing material band.

4. The invention of claim 3, which includes the additional step of:
   (a) passing said interlocked leading and trailing edges of said inner winding, said outer winding and said sealing material band through a pair of knurling wheels; and
   (b) forming a stitched crimp seam of said interlocked leading and trailing edges of said inner winding, said outer winding and said sealing material band with said knurling wheels.

5. The invention of claim 3, which includes the additional step of:
   (a) folding said leading and trailing edges of said inner winding, said outer winding and said sealing material band; and
   (b) passing said folded leading and trailing edges through a tucker assembly for interlocking same.

6. The invention of claim 1 wherein said sealing material band comprises an inner sealing material band located between said inner and outer windings, and which includes the additional step of:

(a) spiral-winding an outer sealing material band in overlying relation over said outer winding.

7. The invention of claim 6, which includes the additional step of:
   (a) overlapping leading and trailing edges of said outer sealing material band.

8. The invention of claim 1 which includes the additional steps of:
   (a) forming said inner winding with a convoluted, cross-sectional configuration; and
   (b) forming said outer winding with a convoluted, cross-sectional configuration.

9. The invention of claim 1, which includes the additional step of:
   (a) guiding said windings and said sealing material band over guide rollers positioned in a helical flow path.

10. A method of forming flexible piping, which includes the steps of:
    (a) spiral-winding an inner winding comprising a metallic band;
    (b) interlocking leading and trailing edges of said inner winding;
    (c) spiral-winding an outer winding comprising a metallic band in overlying relation over said inner winding;
    (d) interlocking leading and trailing edges of said outer winding;
    (e) spiral-winding a sealing material band in overlying relation with respect to at least one of said inner and outer windings, the leading edge of said sealing material band being folded together with the leading edge of said at least one winding, the trailing edge of said sealing material band being folded together with the trailing edge of said at least one winding, and said folded leading edges of said sealing material band and said at least one winding being interlocked with said folded trailing edges of said sealing material band and said at least one winding.

11. The invention of claim 10, wherein:
    (a) the leading edge of said sealing material band is folded together with the leading edge of both of said windings, the trailing edge of said sealing material band is folded together with the trailing edge of both of said windings, and said folded leading edges of said sealing material band and both of said windings is interlocked with said folded trailing edges of said sealing material band and both of said windings.

12. The invention of claim 10 wherein there are two of said sealing material bands located between said inner and outer windings, and wherein:
    (a) one of said sealing material bands is spiral-wound is overlying relation with respect to said inner winding and the other of said sealing material bands is spiral-wound in overlying relation with respect to said outer winding.

13. The invention of claim 10 wherein said sealing material band comprises an inner sealing material band located between said inner and outer windings, and which includes the additional step of:
    (a) spiral-winding an outer sealing material band in overlying relation over said outer winding.

14. The invention of claim 13, which includes the additional step of:
    (a) overlapping leading and trailing edges of said outer sealing material band.

15. The invention of claim 10 which includes the additional steps of:
    (a) forming said inner winding with a convoluted, cross-sectional configuration; and
    (b) forming said outer winding with a convoluted, cross-sectional configuration.

16. The invention of claim 10, which includes the additional step of:
    (a) guiding said windings and said sealing material band over guide rollers positioned in a helical flow path.

17. The invention of claim 16, which includes the additional step of:
    (a) passing said interlocked leading and trailing edges of said inner winding, said outer winding and said sealing material band through a pair of knurling wheels; and
    (b) forming a stitched crimp seam of said interlocked leading and trailing edges of said inner windings, said outer winding and said sealing material band with said knurling wheels.

* * * * *